Oct. 26, 1965 LE ROY H. CARSON 3,214,569
TEMPERATURE CONTROL SYSTEM
Filed Feb. 8, 1962 2 Sheets-Sheet 1
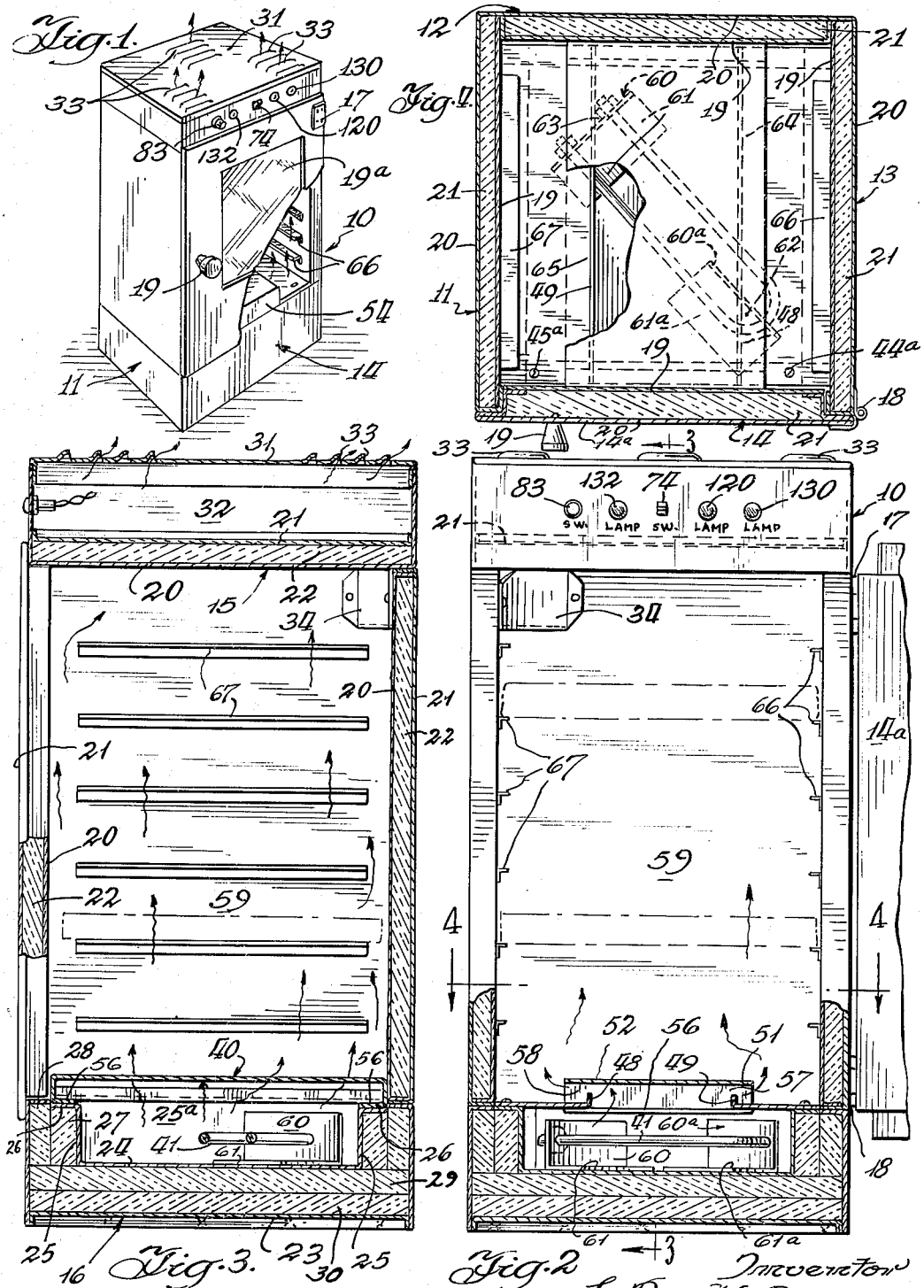
Inventor
Le Roy H. Carson
By Joseph J. Grass
Attorney Oct. 26, 1965      LE ROY H. CARSON      3,214,569

TEMPERATURE CONTROL SYSTEM

Filed Feb. 8, 1962      2 Sheets-Sheet 2

Inventor
Le Roy H. Carson
By Joseph J. Gross
Attorney

United States Patent Office 3,214,569
Patented Oct. 26, 1965

3,214,569
TEMPERATURE CONTROL SYSTEM
LeRoy H. Carson, Chicago, Ill., assignor to S. E. Linden, doing business as Allyn Manufacturing Company, Chicago, Ill., a sole proprietor
Filed Feb. 8, 1962, Ser. No. 172,027
12 Claims. (Cl. 219—489)

This invention relates to an oven and a temperature control system therefor, and in particular it relates to an oven and a temperature control system therefor which is especially useful in reheating and then maintaining a desirable temperature level in items such as pies, pizza and the like, but the invention is not limited to these uses.

It is one of the purposes of the invention to provide an oven and temperature control system therefor which is capable of reheating items of the above-described character quickly and efficiently and than maintaining these items at a predetermined temperature level. When it is desired to reheat the items by employing the oven of the invention, the temperature control system of the invention operates in a high temperature cycle to raise the temperature in the oven chamber to a high temperature level. This high temperature level is sufficient to quickly bring the items to be reheated up to the desired temperature. After the desired temperature level in the oven chamber has reached or at the end of a predetermined period of time, whichever is first, the temperature control system operates in a low temperature cycle to maintain the temperature in the oven chamber at a predetermined low temperature level. In the event that the operator desires to return the temperature control system to he high emperature cycle, the activation of the temperature control system to the high temperature cycle can be quickly and easily accomplished by the operator.

Means are provided for automatically returning the temperature control system to the starting position of the high temperature cycle when the operator wishes to discontinue the operation of the oven for a period of time and when the system is in the low temperature cycle.

It is a feature of the oven of the invention to provide means for diffusing the air which has been heated by the heater, which at the same time serves the function of providing a particle trap for solid particles such as crumbs and the like and liquid particles such as drippings and the like. The heater is so disposed adjacent a bottom member of the oven that an effective distribution pattern of the heated air is accomplished. The heater is preferably elongated and is disposed obliquely and preferably along a hypotenuse of a rectangle defined by the enclosing side walls of the oven.

Figure 6:
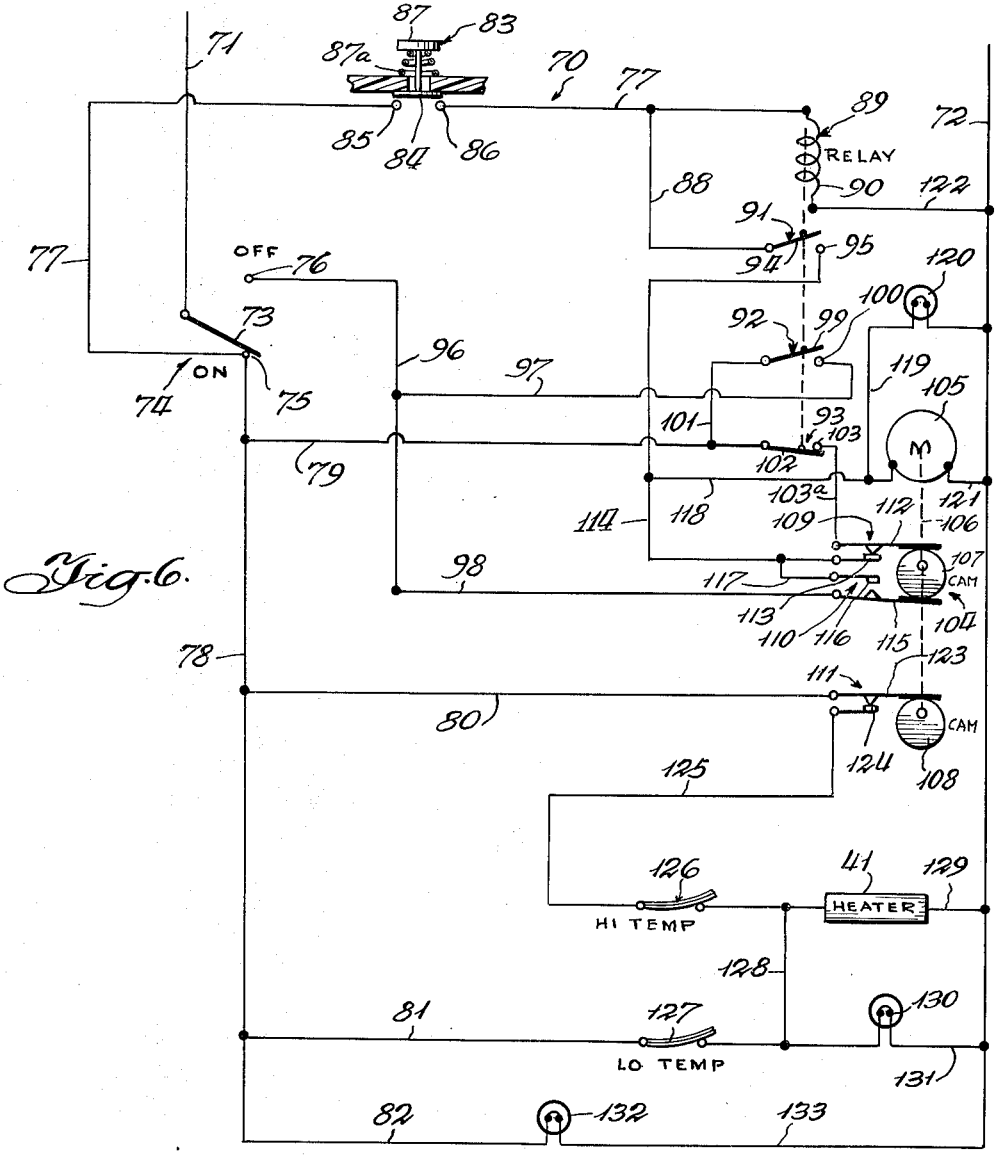
Figure 5:
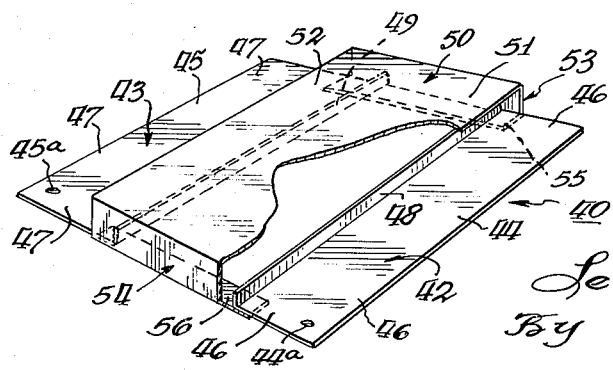

In the illustrative drawings:
FIGURE 1 is a perspective view, partly cut away, showing the oven of the invention;
FIGURE 2 is a front elevation view, partly cut away, exposing an oven chamber;
FIGURE 3 is a cross-sectional view taken along line 3—3 of FIGURE 2;
FIGURE 4 is a cross-sectional view taken along line 4—4 of FIGURE 2, but showing the door in the closed position;
FIGURE 5 is a perspective view, partly cut away, showing the air diffusing and particle trapping member of the invention; and
FIGURE 6 is a schematic view of the temperature control system of the invention.

Referring now to the FIGURES 1 through 5 of the illustrative drawings, there is shown an oven generally indicated at 10. The oven 10 includes enclosing side walls 11, 12, 13, and 14, a roof member 15 and a bottom member 16, a portion of the side wall 14 taking the form of a door 14a. The door 14a is shown to be mounted for pivotal movement on hinges 17 and 18. The door 14a is shown to be provided with a handle 19 and a window 19a. The side walls 11, 12, and 13, the door 14a, and the roof member 15 are preferably constructed of spaced inner and outer panels 20 and 21 between which a layer of insulation material 22 is sandwiched. The bottom member 16 is shown to be constructed of an outer panel 23 and an inner panel 24. The inner panel 24 is joined to inwardly disposed side wall portions 25 of the side walls 11, 12, 13, and 14. The inner panel 24 and the side wall portions 25 of the side walls 11, 12, 13, and 14 form a well 25a. The side wall portions 25 terminate in opposed ledges 26. Two layers of insulation material 27 and 28 are disposed between the side wall portions 25 and the outer panels 21 of the side walls 11, 12, 13, and 14, and two layers of insulation material 29 and 30 are also disposed between the outer panel 23 and the inner panel 24. The upper portion of the side walls 11, 12, 13, and 14, the roof 15 and a cover plate 31 define a chamber 32 for housing components of a temperature control system later to be described. Louvers 33 in the cover plate 31 prevent the accumulation of heat in the chamber 32. Perforations in the cover plate 31 are employable as an alternative to the louvers 33, if desired. Thermostatic switches 126 and 127 (not shown in FIGURES 2 or 3) are mounted behind a shield 34.

In accordance with the invention, there is provided an air diffusing and particle trapping member generally indicated at 40, as best shown in FIGURE 5 of the illustrative drawings. The member 40 serves the dual function of both diffusing the air which has been heated by a heater 41 and of trapping particles of the character described. The member 40 is shown to include a pair of opposed particle traps 42 and 43. The particle traps 42 and 43 include panels 44 and 45 the marginal sides 46 and 47 of which are supported on ledges 26. The panels 44 and 45 are shown to be provide with opposed upstanding flanges 48 and 49 which prevent the particles from falling onto the heater 41. Alternatively, by a construction not shown, the panels 44 and 45 can be inclined slightly outwardly and downwardly and the flanges 48 and 49 can be omitted. The member 40 also includes a partial cover 50, the marginal sides 51 and 52 of which overlie a portion of panels 44 and 45. The partial cover 50 joins depending angle-shaped members 53 and 54, the legs 55 and 56 of which are joined to the panels 44 and 45 for example by welding. Any particles which drop onto the partial cover 50 will either remain there or they may be caused subsequently to fall into the particle traps 42 and 43 where they remain. The partial cover 50 is fully adapted to serve as a shelf for supporting items to be heated. The items placed on the partial cover 50 are thus heated from below by conduction, while the heated air which passes from the well 25a through longitudinally extending openings 57 and 58 in the member 40 into oven chamber 59 heats the items by convection. The member 40 also serves to supply radiant heat into the oven chamber 59. Importantly, since the member 40 extends across the entire distance between the opposed side walls 11, 13, 12 and 14, the heated air is caused to be diffused through the openings 57 and 58 and no particles can pass into the well 25a onto the heater 41. Threaded fasteners 44a and 45a secure the panels 44 and 45, respectively, to the front ledge 26.

The heater 41 is shown to be mounted in the well 25a on brackets 60 and 60a, legs 61 and 61a of which are shown to be mounted on the inner panel 24. The heater 41 is preferably disposed adjacent and spaced from the inner panel 24 of the bottom member 16 so that air is free to circulate around the heater 41. The heater 41 is preferably elongated and disposed obliquely with respect to the side wall portions 25 so as to optimize the advantages of a heater 41 of a simple U-shaped construction in a small sized well 25a. Moreover, the heater 41 is preferably disposed along a hypotenuse of a rectangle formed by the side wall portions 25 of the well 25a. This arrangement also provides a better distribution pattern for the heated air since more heated air passes out of the elongated openings 57 and 58 at places 62 and 63 than at places 64 and 65. Hence, opposed circulating convection currents are established in the oven chamber 59.

A plurality of opposed shelf brackets 66 and 67 are provided to either receive open-mesh shelf elements (not shown), or fitted trays containing items of the character described.

The various components of the oven of the invention are constructed of conventional materials of construction, suitable for the intended purpose.

Referring now to a temperature control system generally indicated at 70 shown schematically in FIGURE 6 of the illustrative drawings, there are shown leads 71 and 72 which lead from a suitable source of electrical energy supply. Lead 71 is connected to a switch arm 73 of a switch 74. The switch 74 is preferably a single pole double-throw toggle switch but any switching means of a character to cause electrical energy to pass selectively to contacts 75 and 76 is employable. When the contact arm 73 is actuated into contact with the contact 75 the switch 74 is in the "on" position, while when the contact arm 73 is actuated into contact with the contact 76 the switch 74 is in the "off" position. Leads 77 and 78 are connected to the contact 75. Leads 79, 80, 81, and 82 are connected to the lead 78. The lead 77 has disposed therealong a momentarily operable manual switch 83. The switch 83 is illustrated as having a contact element 84 for bridging the gap between contacts 85 and 86 when a button 87 is depressed against the urging of a spring 87a. Any suitable momentarily operable manual switch is employable for the purpose later to be described.

The lead 77 is connected to a lead 88 and a relay generally indicated at 89. The relay 89 includes a coil 90 and switches 91, 92, and 93 which are controlled thereby. The switch 91 includes a contact arm 94 which is adapted to engage a contact 95. The lead 88 is connected to the contact arm 94.

A lead 96 is connected to the contact 76, and in turn leads 97 and 98 are connected to the lead 96. The switch 92 includes a contact arm 99 which is adapted to engage a contact 100. The contact arm 99 is connected to a lead 101 which is connected to the lead 79, while the contact 100 is connected to the lead 97. The switch 93 includes a contact arm 102 which is shown to be engaged with a contact 103. The switches 91 and 92 are normally open when the switch 93 is normally closed unless, of course, the coil 90 of the relay 89 is energized.

A timing mechanism generally indicated at 104 includes a timing motor 105 which is mechanically connected as indicated by the broken line 106 to its associated cams 107 and 108. Switches 109 and 110 are controlled by the cam 107 while a switch 111 is controlled by the cam 108. The switch 109 includes a contact arm 112, operable by the cam 107, and a contact 113. The contact 103 and the contact arm 112 are connected by a lead 103a. The contact 113 is connected to a lead 114 which in turn is connected to the contact 95. The switch 110 includes a contact arm 115, operable by the cam 107, and a contact 116. The contact 116 is connected to a lead 117 which is connected to the lead 114.

The timing motor 105 is energizable over a lead 118 which is connected to the lead 114. A lead 119, in parallel with the motor 105, has disposed therealong a lamp 120. The lead 119 is connected at one end to the lead 118 and at the other end to the lead 72. The timing motor 105 is connected by a lead 121 to the lead 72, and the coil 90 of the relay 89 is connected by a lead 122 to the lead 72.

The switch 111 includes a contact arm 123, operable by the cam 108, and a contact 124. The contact 124 is connected by a lead 125 to a thermostatic switch 126 which is normally closed but which is opened in response to the attainment of a high temperature level in the oven chamber 59. The thermostatic switch 127 disposed along the lead 81 is normally closed but is opened in response to the attainment of a low temperature level in the oven chamber 59. A lead 128 connects leads 81 and 125. The heater 41 is connected to the lead 125 and over a lead 129 to the lead 72. A lamp 130 connected in parallel with the heater 41 is connected to the lead 81 and over a lead 131 to the lead 72.

A lamp 132 is connected to the lead 82 and over a lead 133 to the lead 72. It is apparent, therefore, that the lamp 120 will be lit whenever the timing motor 105 is energized, that the lamp 130 will be lit whenever the heater 41 is energized, and that the lamp 132 will be lit whenever electrical energy is supplied to the lead 78 by the actuation of the switch 74 to the "on" position.

It is pointed out that although the heater 41 is preferably of the electrical resistance type, the temperature control system 70 is of a character to function equally well upon the employment of other types of heaters, such as steam, oil, or gas heaters.

In operation, assuming that the timing motor 105 is in the starting position and assuming that the contact arm 73 of the switch 74 is manually actuated to the "on" position, electrical energy will be supplied to the heater 41 over two paths, namely over the lead 78, over the lead 80, over the switch 111, over the lead 125 and the high temperature thermostatic switch 126 and also over the lead 81 and the low temperature thermostatic switch 127, over the lead 128, and over a portion of the lead 125. The lead 128 assures that whenever electrical energy is being supplied over the lead 125 and the high temperature thermostatic switch 126 or over the lead 81 and the low temperature thermostatic switch 127 both the heater 41 and the lamp 130 will be energized.

Actuation of the switch 74 to the "on" position simultaneously energizes the timing motor 105 by a circuit made over the lead 78, over the lead 79, over the switch 93, over the lead 103a, over the switch 109, over the lead 114, and over the lead 118. The timing motor 105 continues to operate for a predetermined period of time, at the end of which period of time the cam 108 opens the switch 111. This interrupts the passage of electrical energy from the lead 80, over the lead 125 and the high temperature thermostatic switch 126 to the heater 41. The passage of electrical energy to the heater 41 is also interrupted by the opening of the high temperature thermostatic switch 126 in response to a high temperature level in the oven chamber 59.

Even though the low temperature thermostatic switch 127 opens in response to a low temperature level in the oven chamber 59, electrical energy is still supplied to the heater 41 and the lamp 130 unless either the switch 111 is opened by the cam 108 or the high temperature thermostatic switch 126 is opened. When electrical energy is being supplied to the heater 41 and the lamp 130 over the lead 125 over the high temperature thermostatic switch 126, the system 70 of the invention is in what may be termed the high temperature cycle. When electrical energy is only being supplied to the heater 41 and the lamp 130 over the lead 81, over the low temperature thermostatic switch 127 and the lead 128, the system 70 of the invention is in what may be termed the low temperature cycle. The opening of the switch 111 causes the system 70 to operate in the low temperature cycle.

The timing motor 105 continues to operate in a circuit made over the lead 78, over the lead 79, over the normally closed switch 93, over the lead 103a, over the normally closed switch 109, over the lead 114 and over the lead 118 until the cam 107 operates to open the switch 109 and to simultaneously close the switch 110. Hence, no electrical energy passes over the lead 96, over the lead 98, over the switch 110, over the lead 117, over a portion of the lead 114, over the lead 118 to the timing motor 105, the switch 74 being in the "on" position.

In the event that the operator desires to return the system 70 to the high temperature cycle, he momentarily manually depresses the momentarily operable manual switch 83 which automatically returns the timing motor 105 to its starting position when the switch 110 is open, that is, during the low temperature cycle. The circuit for causing the automatic return of the timing motor 105 to its starting position is made over the lead 77 by the momentary depression of the switch 83, to the coil 90 of the relay 89, and over the lead 122 to the lead 72; the energization of the relay 89 activates its associated switches 91 and 92 to the closed position and actuates its associated switch 93 to the open position. In particular, the closing of the switch 91 causes a circuit to be made over the lead 88, over the switch 91, over the lead 114, and over the lead 118 to the timing motor 105. The continued operation of the timing motor 105, for a relatively brief period of time causes the cam 108 to close the switch 111. Since the temperature level of the oven chamber 59 at this time will be below the setting of the high temperature thermostatic switch 126, the high temperature thermostatic switch 126 is already closed and the heater 41 and the lamp 130 are energized. Meanwhile, the closing of switches 91 and 92 causes a circuit to be made over the lead 78, over the lead 79, over the lead 101, over the switch 92, over the lead 97, over the lead 96, over the lead 98, over the switch 110, over the lead 117, over the lead 114, over the switch 91, over the lead 88, over the lead 77, over the coil 90 and over the lead 122 to the lead 72, thereby causing the continued energization of the relay 89 and the holding of switches 91, 92, and 93 until the cam 107 rotates to open the switch 110 and simultaneously close the switch 109. Closing of the switch 109 causes the continued energization of the timing motor 105 over an above-described circuit. Since the switch 111 is also closed by the rotation of the timing motor 105, the high temperature cycle of the system 70 stays in effect until either the switch 111 or the high temperature thermostatic switch 126 is opened. When the cam 107 has rotated sufficiently to open the switch 109, the relay 89 is deenergized and the switches 91 and 92 open and the switch 93 closes.

Should the operator desire to turn the system 70 of the invention off for a period of time, he simply manually actuates the switch 74 into the "off" position. In the event the system 70 of this invention is in the low temperature cycle, the switch 110 being closed a circuit will be made over the lead 96, over the lead 98, over the switch 110, over the lead 117, over the lead 114, over the lead 118 to the timing motor 105 whereby the timing motor 105 is automatically returned to its starting position.

It is readily apparent that the switch 83 is ineffective to cause either the energization or the holding of the relay 89 in the event the switch 74 is in the "off" position.

In addition, although the relay 89 can be momentarily energized in the event the switch 74 is in the "on" position by the depression of the switch 83 when the timing motor 105 is operating by the making of a momentary circuit made over the lead 77, over the switch 83, and to the coil 90 of the relay 89, no holding circuit is made over the lead 114 and over the switch 91 since the switch 110 is open.

By way of specific example only, but in no sense to limit the invention, the high temperature thermostatic switch 126 is preferably set to open in response to a 375° F. temperature level in the oven chamber 59, while the low temperature thermostatic switch 127, which is in parallel with the high temperature thermostatic switch 126, is preferably set to open in response to a 130° F. temperature level in the oven chamber 59. By further way of example, the timing motor 105 operates for about 26 minutes whereupon switch 111 is opened by the cam 108. After two more minutes the switches 109 and 110 are opened and closed, respectively. By the end of 30 minutes the timing motor 105 and the cams 107 and 108 have returned to their starting positions, assuming either that the momentary switch 83 has been operated when the timing motor 105 has ceased to be operated or that the switch 74 has been actuated from the "on" position to the "off" position. It is to be understood that other and different suitable timing arrangements are within the purview of the invention.

The above-described embodiment being exemplary only, it will be understood that the present invention comprehends organizations differing in form or detail from the presently described embodiment. Accordingly, the invention is not to be considered as limited save as is consonant with the scope of the following claims.

What is claimed is:

1. In a temperature control system: a heater for heating a chamber, a first switch, a high temperature thermostatic switch openable upon attainment of a high temperature level in said chamber, said first switch and said high temperature thermostatic switch electrically connected in series to operate said heater, a low temperature thermostatic switch openable upon attainment of a low temperature level in said chamber, said high and low temperature thermostatic switches being electrically arranged in parallel, timing means having a starting position and including an electrical timing motor, a second switch in series with said timing motor, a third switch, a first cam driven by said timing motor for opening and closing said first switch, a second cam driven by said timing motor for simultaneously opening said second switch and closing said third switch and for simultaneously closing said second switch and opening said third switch, a manual momentary switch, a relay momentarily energizable by the momentary closing of said momentary switch, a holding circuit including said third switch, a fourth switch and a fifth switch for holding said relay energized, a sixth switch, said relay being arranged to close said fourth and fifth switches and open said sixth switch when energized and to open said fourth and fifth switches and close said sixth switch when deenergized, an electrical connection from said holding circuit to said timing motor to effect energization of said timing motor when said holding circuit is completed, said second and sixth switches being electrically connected in series to energize said timing motor when closed, a timing motor energizing circuit including said third switch for energizing said timing motor when said third switch is closed, and means for alternately and selectively interrupting the supply of electrical energy to said first, second and sixth switches and said thermostatic switches, and for establishing said timing motor energizing circuit to return said timing means to a starting position.

2. In a temperature control system: means for heating a chamber, a first circuit including means for alternately operating said heating means in a high temperature cycle and in a low temperature cycle to effect high temperature and low temperature, respectively, in said chamber, timing means having a starting position and including an electrical timing motor, a second circuit including a switch in series with said timing motor, means controlled by said timing motor for causing said operating means to change from said high temperature cycle to said low temperature cycle after a period of time, means controlled by said timing motor for opening said switch when said operating means is in the low temperature cycle, and a third circuit including means for energizing said timing motor to return said timing means to a starting position, and means for alternately and selectively connecting said first and second circuits, and said third circuit, to a source of electrical energy supply.

3. The invention defined in claim 2 wherein said connecting means includes a single pole double-throw switch.

4. In a temperature control system: means for heating a chamber, a first circuit including means for alternately operating said heating means in a high temperature cycle and in a low temperature cycle to effect high temperature and low temeprature, respectively, in said chamber, timing means having a starting position and including an electrical timing motor, a second circuit including a switch in series with said timing motor, means controlled by said timing motor for causing said operating means to change from said high temperature cycle to said low temperature cycle after a period of time, means controlled by said timing motor for opening said switch when said operating means is in the low temperature cycle, a third circuit for energizing said timing motor to return said timing means to a starting position, and means for alternately and selectively connecting said first and second circuits, and said third circuit, to a source of electrical energy supply, and a fourth circuit electrically connected to said first and second circuits, and means for energizing said timing motor when said second switch is open to return said timing means to a starting position including a manual momentary switch in said fourth circuit.

5. In a temperature control system: means for heating a chamber, means for alternately operating said heating means in a high temperature cycle and in a low temperature cycle to effect high temperature and low temperature, respectively, in said chamber, said operating means including a first switch, timing means including an electrical timing motor, a second switch in series with said timing motor, a third switch, a first cam driven by said timing motor for opening and closing said first switch, a second cam driven by said timing motor for simultaneously opening said second switch and closing said third switch and for simultaneously closing said second switch and opening said third switch, a manual momentary switch, a relay momentarily energizable by the momentary closing of said momentary switch, a holding circuit including said third switch and switch means for holding said relay energized, said relay being arranged to close said switch means when energized and to open said switch means when de-energized, said third switch and said switch means being arranged in series, and means electrically connected to said holding circuit for energizing said timing motor when said holding circuit is completed so that said timing motor is operated through said holding circuit until said third switch is opened and said second switch is closed by said second cam.

6. The invention defined in claim 5 including means operable by said relay upon the momentary closing of said momentary switch for preventing the establishment of said holding circuit when said timing motor is operating.

7. The invention defined in claim 5, wherein said switch means includes a fourth switch and a fifth switch, said fifth switch being electrically connected in series with said third and fourth switches to prevent a holding circuit from being established over said third, fourth and fifth switches while said third switch is open.

8. In a temperature control system: means for heating a chamber, means for alternately operating said heating means in a high temperature cycle and in a low temperature cycle to effect high temperature and low temperature, respectively, in said chamber, said operating means including a first switch, a timing motor, a second switch in series with said timing motor, a third switch, a first cam driven by said timing motor for operating said first switch, a second cam driven by said timing motor for simultaneously opening said second switch and closing said third switch and for simultaneously closing said second switch and opening said third switch, a manual momentary switch, a holding relay momentarily energizable by the momentary closing of said momentary switch, a holding circuit including said third switch and said holding relay and established by the momentary closing of said momentary switch for causing continued energization of said holding relay, and means for energizing said timing motor while said holding circuit is closed and until said first and second cams operate said first switch and said second and third switches to return said operating means to high temperature cycle operation.

9. In a temperature control system: means for heating a chamber, means for alternately operating said heating means in a high temperature cycle and in a low temperature cycle to effect high temperature and low temperature, respectively, in said chamber, timing means for causing operation of said operating means in said high temperature cycle for a period of time at the end of which said operating means is caused to operate in said low temperature cycle, means for automatically interrupting the operation of said timing means when said operating means is operating in said low temperature cycle, and means effective during said low temperature cycle and electrically connectable to said timing motor for causing return to said high temperature cycle.

10. In a temperature control system: a heater for heating a chamber, a first switch, and a high temperature thermostatic switch openable upon attainment of a high temperature level in said chamber, all electrically connected in series, a high temperature cycle being provided when said first switch is closed and a low temperature cycle being provided when said first switch is open, a low temperature thermostatic switch, openable upon attainment of a low temperature level in said chamber and said heater electrically connected in series, said high and low temperature thermostatic switches being electrically arranged in parallel, timing means including an electrical timing motor, a second switch electrically connected in series with said timing motor, said timing means having means for opening said first switch after a period of time to effect operation in said low temperature cycle and for opening said second switch to de-energize said timing motor, a momentarily operable manual switch effecitve when said second switch is open, and means responsive to the momentary closing of said momentarily operable switch for re-energizing said timing motor to cause closing of said first switch to again effect operation in the high temperature cycle.

11. In a temperature control system: a first switch, a high temperature thermostatic switch openable upon attainment of a high temperature level, and a heater all electrically connected in series, a high temperature cycle being provided when said first switch is closed and a low temperature cycle being provided when said first switch is open, a low temperature thermostatic switch, openable upon attainment of a low temperature level, and said heater electrically connected in series, said high and low temperature thermostatic switches being electrically arranged in parallel, timing means including an electrical timing motor, a second switch electrically connected in series with said timing motor, said timing means having means for opening said first switch after a period of time to permit operation in said low temperature cycle and for opening said second switch to de-energize said timing motor, and means, including another switch, effective when said second switch is open for re-energizing said timing motor to effect closing of said first switch to cause return to said high temperature cycle.

12. In a temperature control system: means for heat- a chamber, means for alternately operating said heating means in a high temperatue cycle and in a low temperature cycle to effect high temperature and low temperature, respectively, in said chamber, a switch, timing means including an electrical timing motor and means operable by said timing motor for opening said switch after a period of time to de-energize said timing motor and for closing said switch to permit said operating means to effect high temperature cycle operation, a momentarily operable manual switch effective when said operating means is in said low temperature cycle, and means responsive to the momentary closing of said momentarily operable switch for effecting re-energization of said timing motor until said switch has been closed so that said operating means is returned to high temperature cycle operation.

References Cited by the Examiner

UNITED STATES PATENTS

| | | | |
|---|---|---|---|
| 2,023,117 | 12/35 | Biebel | 219—510 |
| 2,023,118 | 12/35 | Biebel | 219—413 |
| 2,248,867 | 7/41 | Hallman | 219—400 |
| 2,422,950 | 6/47 | Cash | 219—474 |
| 2,463,329 | 3/49 | Stansbury | 219—422 |
| 2,483,526 | 10/49 | Candor | 219—489 |
| 2,623,449 | 12/52 | Losee | 219—369 X |
| 2,935,594 | 5/60 | Christenson | 219—398 |
| 2,977,451 | 3/61 | Campbell | 219—516 |
| 2,987,602 | 6/61 | Hodges | 219—511 |
| 3,003,409 | 10/61 | Mills | 219—411 X |
| 3,032,636 | 5/62 | Schauer | 219—412 |
| 3,033,633 | 5/62 | Holloway et al. | 219—214 X |

RICHARD M. WOOD, *Primary Examiner.*